United States Patent
Izumi et al.

(10) Patent No.: US 11,203,081 B2
(45) Date of Patent: Dec. 21, 2021

(54) REMOVAL DEVICE OF WELDING ELECTRODE TIP

(71) Applicant: Obara Corporation, Yamanashi (JP)

(72) Inventors: Takehiro Izumi, Yamanashi (JP); Tadao Sakamoto, Yamanashi (JP)

(73) Assignee: OBARA CORPORATION, Yamanashi (JP)

( * ) Notice: Subject to any disclaimer, the term of this patent is extended or adjusted under 35 U.S.C. 154(b) by 377 days.

(21) Appl. No.: 16/354,536

(22) Filed: Mar. 15, 2019

(65) Prior Publication Data

US 2019/0291203 A1 Sep. 26, 2019

(30) Foreign Application Priority Data

Mar. 22, 2018 (JP) .............................. JP2018-054776

(51) Int. Cl.
*B23K 11/30* (2006.01)

(52) U.S. Cl.
CPC ...... *B23K 11/3072* (2013.01); *B23K 11/3063* (2013.01)

(58) Field of Classification Search
CPC ............. B23K 11/3072; B23K 11/115; B23K 11/3063; B23K 11/30; B23K 11/11; B23K 11/3054; B23K 11/31; B23K 11/3018; B23K 11/312; B23K 11/36; B23K 2101/006; B23K 11/364; B23K 11/314;

(Continued)

(56) References Cited

U.S. PATENT DOCUMENTS

| 2,703,357 A | * | 3/1955 | Hall | ...................... B23K 11/30 |
| | | | | 219/120 |
| 4,676,000 A | * | 6/1987 | James | ................... B23P 19/041 |
| | | | | 29/270 |

(Continued)

FOREIGN PATENT DOCUMENTS

| CN | 1575904 A | 2/2005 |
| CN | 206780295 U | 12/2017 |

(Continued)

OTHER PUBLICATIONS

Office Action dated Jun. 29, 2021 in corresponding Japanese Patent Application No. 2018-054776, with English Translation.

(Continued)

*Primary Examiner* — Phuong T Nguyen
*Assistant Examiner* — Yeong Juen Thong
(74) *Attorney, Agent, or Firm* — Wenderoth, Lind & Ponack, L.L.P.

(57) ABSTRACT

A removal device of a welding electrode tip includes a first insertion piece and a second insertion piece that are inserted into a space formed between an end surface of a large diameter portion of a shank and an end surface of the welding electrode tip, each of the first insertion piece and the second insertion piece having a wedge shape having a thickness that increases from a front end to a back portion in an insertion direction, wherein the first insertion piece and the second insertion piece have a thickness by overlap of the first insertion piece and the second insertion piece, and the thickness changes from a thickness smaller than a length of the space to a thickness larger than the length of the space according to an overlap amount in the space.

2 Claims, 13 Drawing Sheets

(58) Field of Classification Search
CPC ..... B23K 11/002; B23K 11/163; B23K 11/20; B23K 11/3009; B23K 11/362; B23K 2101/18; B23K 2103/04; B23K 2103/14; B23K 2103/20; B23K 31/02; B23K 35/0205; B23K 35/222; B23K 37/0435; B23K 9/123; B23K 9/173; B23K 9/26; B23K 9/32
USPC .......................................................... 81/9.44
See application file for complete search history.

(56) References Cited

U.S. PATENT DOCUMENTS

| | | | | |
|---|---|---|---|---|
| 5,073,692 | A * | 12/1991 | Jackson | B23K 11/3072 219/86.8 |
| 5,767,474 | A * | 6/1998 | Shimada | B23K 11/3063 219/86.8 |
| 9,789,678 | B1 * | 10/2017 | Christensen | B32B 43/006 |
| 2003/0201253 | A1 * | 10/2003 | Rigaux | B23K 11/3072 219/86.8 |
| 2005/0016967 | A1 * | 1/2005 | Izumi | B23K 11/3072 219/86.8 |
| 2006/0101630 | A1 * | 5/2006 | Nakajima | B23K 11/3072 29/267 |
| 2007/0040155 | A1 * | 2/2007 | Pan | B25C 11/02 254/28 |
| 2017/0173727 | A1 * | 6/2017 | Fukizawa | B23K 11/115 |

FOREIGN PATENT DOCUMENTS

| | | |
|---|---|---|
| JP | H03-111470 U | 11/1991 |
| JP | H04-052083 A | 2/1992 |
| JP | 2004-66252 | 3/2004 |
| JP | 2018-126284 A | 6/2008 |
| JP | 2012-40600 | 3/2012 |

OTHER PUBLICATIONS

Office Action dated Jun. 16, 2021 in corresponding Chinese Patent Application No. 201910090302.5.

* cited by examiner

REMOVAL DEVICE OF WELDING ELECTRODE TIP

CROSS-REFERENCE TO RELATED APPLICATION

The present application is based on and claims priority to Japanese patent application No. 2018-054776, filed Mar. 22, 2018, the disclosure of which is hereby incorporated by reference herein in its entirety.

BACKGROUND

Technical Field

The present disclosure relates to a removal device of a welding electrode tip.

Description of Related Art

A welding electrode tip (hereinafter referred to as an electrode tip) is fitted onto a tapered leading end portion of a shank from an axial leading end of the shank, and is fixed to the shank through the fitting onto the tapered portion.

The shank includes an axial back portion having a diameter larger than that of the leading end portion of the shank. In order to remove the electrode tip from the shank, an insertion member (insertion piece) is inserted into a space between an end surface of the electrode tip and an end surface of the portion having a large diameter (large diameter portion), and a rotation member provided in the insertion piece is rotated to contact the space. The rotation member is rotated around the contact point of the insertion piece and the end surface of the large diameter portion of the shank as a supporting point. The insertion piece contacts only a part of the end surface of the electrode tip and only a part of the end surface of the large diameter portion of the shank. The electrode tip is removed from the shank by moving the electrode tip with respect to the shank (see, for example, JP2012-040600A and JP2004-066252A).

However, the insertion piece only contacts semicircle areas of the end surface of the electrode tip and the end surface of the shank, and the contact length of the insertion piece in the radial direction is extremely small, for example, about 1 mm. For this reason, when a large load is applied in the axis direction, the insertion piece receives a reactive force, which concentrates a bending moment and a shearing force in the insertion piece, resulting in damage or deformation of the insertion piece. An electrode tip for use in a welding device that welds a material receiving a high welding pressure is fitted onto the shank with a strong load according to the welding pressure. Such a configuration increases a load to be applied to the insertion piece for removing the electrode tip, and easily damage or deform the electrode tip.

In order to prevent or control such damage or deformation, it may be desirable to strengthen the insertion piece by a thermal process, for example. However, such an additional thermal process increases manufacturing costs of the insertion piece.

SUMMARY

The present disclosure has been made in view of the above circumstances. An object of the present disclosure is, therefore, to provide a removal device of a welding electrode tip capable of preventing and controlling an insertion piece from being damaged and deformed without strengthening the insertion piece.

To achieve the above object, an aspect of the present disclosure provides a removal device of a welding electrode tip mounted on a leading end portion of a shank, the removal device including a first insertion piece and a second insertion piece that are inserted into a space formed between an end surface of a large diameter portion of the shank and an end surface of the welding electrode tip from an outside of the shank in a radial direction to face each other, the large diameter portion having a diameter larger than that of the leading end portion, and each of the first insertion piece and the second insertion piece having a wedge shape having a thickness that increases from a front end to a back portion in an insertion direction, wherein the first insertion piece and the second insertion piece have a thickness by overlap of the first insertion piece and the second insertion piece, and the thickness changes from a thickness smaller than a length of the space to a thickness larger than the length of the space according to an overlap amount in the space.

DETAILED DESCRIPTION

Figure 1A:
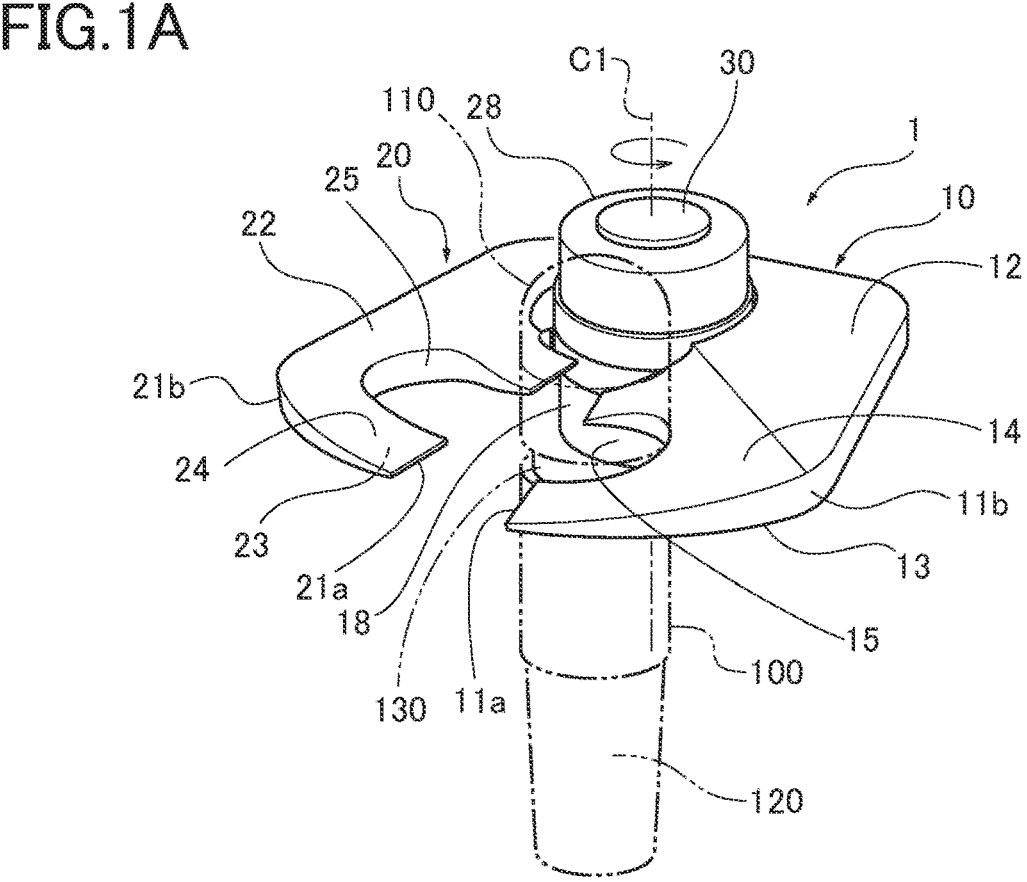
FIG. 1A is a perspective view, seen from an electrode tip side, illustrating a removal device of a welding electrode tip as one embodiment of the present disclosure.
Figure 1B:
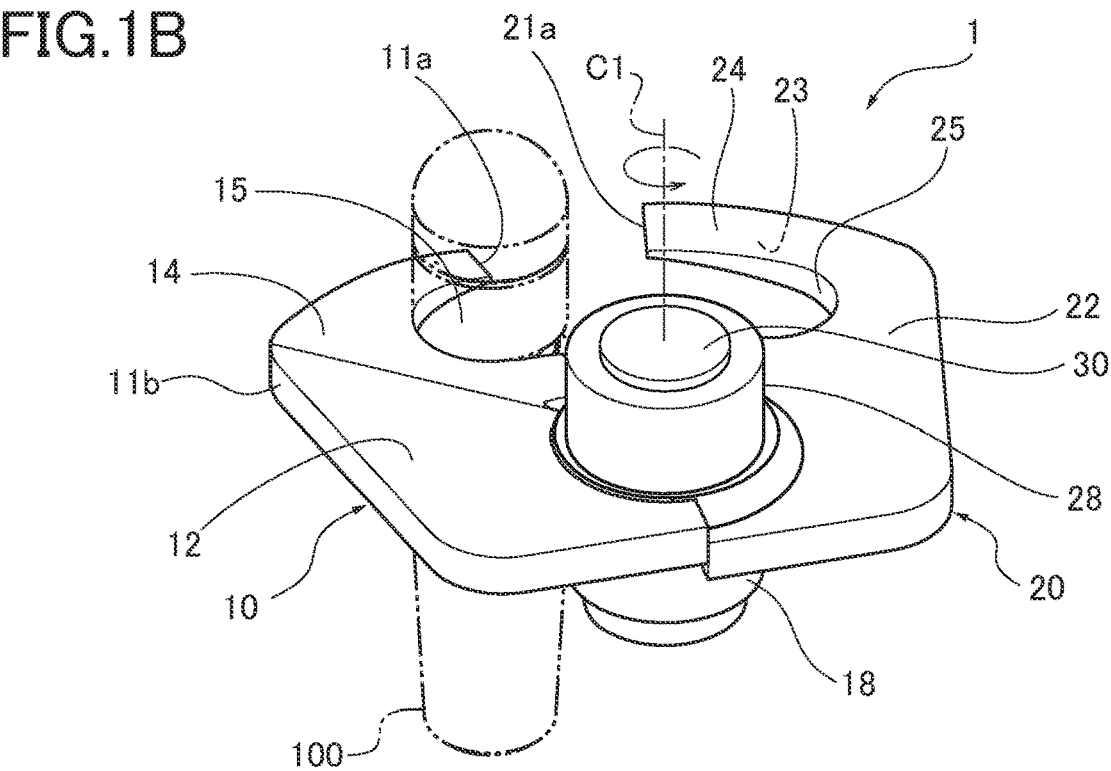
FIG. 1B is a perspective view, seen from the side opposite to the electrode tip, illustrating the removal device illustrated in FIG. 1A.
Figure 2:
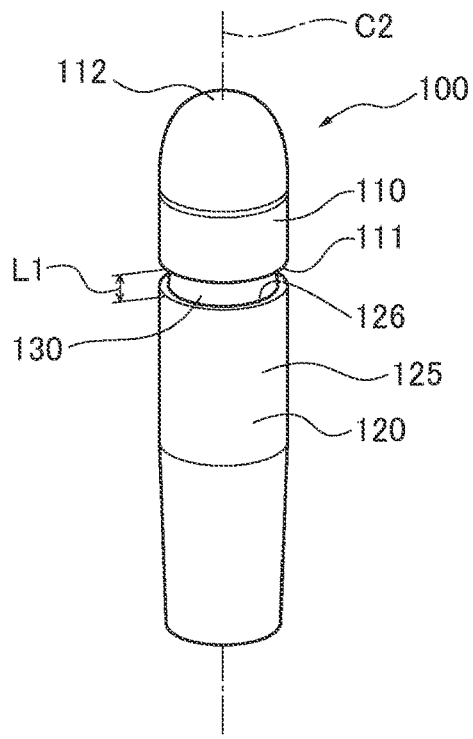
FIG. 2 is a perspective view illustrating an electrode member from which the electrode tip is removed by the removal device.
Figure 3:
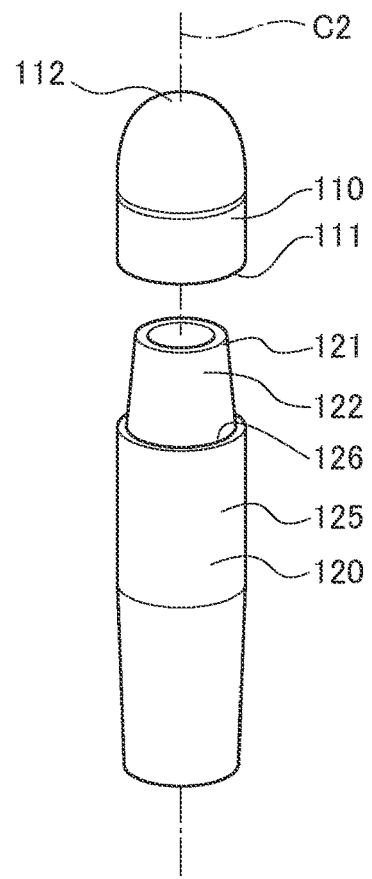
FIG. 3 is a perspective view illustrating the electrode member in which the electrode tip is separated from a shank.

Hereinafter, an embodiment of a removal device of a welding electrode tip according to the present disclosure is described with reference to the drawings. FIG. 1A is a perspective view, seen from a welding electrode tip 110 (hereinafter, referred to as an electrode tip) side, illustrating a removal device 1 of the electrode tip 110 as one embodiment of the present disclosure. FIG. 1B is a perspective view, seen from the side opposite to the electrode tip 110, illustrating the removal device 1 illustrated in FIG. 1A. FIG. 2 is a perspective view illustrating an electrode member 100 from which the electrode tip 110 is removed by the removal device 1. FIG. 3 is a perspective view illustrating the electrode member 100 in which the electrode tip 110 is separated from a shank 120.

As illustrated in FIG. 2, the electrode member 100 for use in a resistance welding gun includes the shank 120 and the electrode tip 110. The shank 120 and the electrode tip 110 are made of a material such as copper alloy.

As illustrated in FIG. 3, the shank 120 has an approximate cylindrical shape. The shank 120 includes, on the one end portion thereof in a direction of a central axis C2, a leading end portion 122. The leading end portion 122 includes, on one end thereof in the direction of the central axis C2, a leading end 121. The leading end portion 122 has a tapered shape having a diameter continuously decreasing toward the leading end 121.

The electrode tip 110 has a cylindrical shape having a closed one end in the direction of the central axis C2. An outer surface of the closed end is formed into an approximate hemisphere surface, and is a leading end portion 112 which contacts a member to be welded as a welding target. The electrode tip 110 is fitted onto the leading end portion 122 of the shank 120 to be mounted on the shank 120. The electrode tip 110 is therefore fixed by a frictional force of an inner circumferential surface of the electrode tip 110 and the leading end portion 122 of the shank 120.

The other end of the leading end portion 122 of the shank 120 in the direction of the central axis C2 is provided with a large diameter portion 125 having a diameter larger than that of a largest diameter portion of the leading end portion 122. An end surface 126 of the large diameter portion 125 is formed as a step surface between the leading end portion 122 and the large diameter portion 125.

As illustrated in FIG. 2, in the electrode member 100 in which the electrode tip 110 is mounted on the leading end portion 122, the large diameter portion 125 is provided to have the end surface 126 facing an end surface 111 of the electrode tip 110 (an end surface opposite to the leading end portion 112) in the direction of the central axis C2. A space 130 (a neck portion having a diameter smaller than the diameter of the end surface 111 of the electrode tip 110 and the diameter of the large diameter portion 125) having a size (length) L1 is thereby formed between the end surface 111 of the electrode tip 110 and the end surface 126 of the large diameter portion 125 along the direction of the central axis C2.

The removal device 1 of the electrode tip 110 is a device of removing the electrode tip 110 mounted on the leading end portion of the shank 120. As illustrated in FIGS. 1A, 1B, the removal device 1 of the electrode tip 110 includes a first plate member 10, a second plate member 20, and a columnar shaft member 30. The first plate member 10 includes a flat first plate 12 (one example of a first insertion piece) and a sleeve 18 connected to the first plate 12. The sleeve 18 is connected to one end portion of the first plate 12 in a direction orthogonal to a plate face (surface) of the first plate 12.

The second plate member 20 also includes a flat second plate 22 (one example of a second insertion piece) and a sleeve 28 connected to the second plate 22. The sleeve 28 is connected to one end portion of the second plate 22 in a direction orthogonal to a plate face of the second plate 22. Although the first plate 12 and the second plate 22 have the same thickness, they may have a different thickness.

In this embodiment, the sleeves 18, 28 have a cylindrical external appearance. However, the sleeves 18, 28 are not limited to the cylindrical shape, and may have another shape such as a columnar shape or a prismatic columnar shape. The sleeves 18, 28 may have the same shape or a different shape from each other.

The first plate member 10 and the second plate member 20 of the embodiment have the same shape as a whole. However, as described later, it is preferable to set a length of a cutout portion 25 formed in the second plate 22 to be longer than a length of a cutout portion 15 formed in the first plate 12.

The first plate member 10 and the second plate member 20 are combined in which the sleeves 18, 28 are overlapped to be aligned, and the shaft member 30 penetrates through the sleeves 18, 28. In this case, each of the sleeves 18, 28 projects outside (the sleeve 18 is located below the sleeve 28 in FIGS. 1A, 1B).

When the first plate member 10, the second plate member 20, and the shaft member 30 are integrated, as illustrated in FIGS. 1A, 1B, the first plate 12 and the second plate 22 are located at the approximate same height in the vertical direction (a direction of a central axis C1).

The first plate member 10 and the second plate member 20 of the removal device 1 are relatively rotatable about the central axis C1 of the shaft member 30.

Each of the first plate 12 and the second plate 22 has a wedge shape having a thickness gradually increasing from each front end 11a, 21a to each back portion 11b, 21b in each rotation direction. The front ends 11a, 21a of the first plate 12 and the second plate 22 come close to face each other when the first plate member 10 and the second plate member 20 relatively rotate about the central axis C1.

More specifically, the first plate 12 includes a lower surface 13 orthogonal to the central axis C1 and an upper surface 14 having an inclined surface relative to the lower surface 13. The thickness of the front end 11a in the inclined surface is thinner than the thickness of the back portion 11b (a portion parallel to the lower surface 13). In the inclined portion of the upper surface 14, the thicknesses are the same in all positions along the radial direction at freely set angles about the central axis C1. The upper surface 14 may have in part an inclined surface as described above, or may have as a whole an inclined surface.

On the other hand, the second plate 22 includes an upper surface 24 orthogonal to the central axis C1, and a lower surface 23 having an inclined surface relative to the upper surface 24. The thickness of the front end 21a in the inclined surface is thinner than the thickness of the back portion 21b (plane portion parallel to the upper surface 24). In the inclined portion of the lower surface 23, the thicknesses are the same at all positions along the radial direction at freely set angles about the central axis C1. The lower surface 23 may have in part an inclined surface as described above, or may have as a whole an inclined surface As the first plate 12 and the second plate 22 have the wedge shape, the front end 11a is located below the front end 21a before the first plate member 10 contacts the second plate member 20 by relatively rotating the first plate member 10 and the second plate member 20 about the central axis C1. Then, by further rotating the first plate member 10 and the second plate member 20, the front end 21a of the second plate 22 crosses the front end 11a of the first plate 12. When the front end 21a reaches the inclined surface of the upper surface 14 of the first plate 12, the lower surface 23 of the second plate 22 contacts the inclined surface of the upper surface 14 of the first plate 12, so that the first plate 12 and the second plate 22 are overlapped in the direction of the central axis C1.

By further rotating the first plate member 10 and the second plate member 20 while the inclined surface of the lower surface 23 of the second plate 22 contacts the inclined surface of the upper surface 14 of the first plate 12, the second plate 22 is pushed upward by the first plate 12, and the second plate member 20 displaces above the first plate member 10 in the direction of the central axis C1. The displacement of the second plate member 20 depends on the rotation angle (the overlap amount of the first plate 12 and the second plate 22 about the central axis C1), and the displacement increases in proportional to the rotation angle. As a result, a thickness L by the overlap of the first plate 12 and the second plate 22 in the direction of the central axis C1, which is a length between the lower surface 13 of the first plate 12 and the upper surface 24 of the second plate 22, increases depending on the rotation angle.

The thickness L by the overlap of the first plate 12 and the second plate 22 is minimum at the beginning of the overlap by the contact of the inclined surface of the lower surface 23 of the second plate 22 and the inclined surface of the upper surface 14 of the first plate 12. In this case, the thickness L is smaller than the length (size) L1 of the space 130 in the electrode member 100 (L<L1). The thickness L by the overlap of the first plate 12 and the second plate 22 increases by further rotating the first plate member 10 and the second plate member 20 to be larger than the size L1 of the space 130 in the electrode member 100 (L1<L).

The first plate 12 may have the upper surface 14 orthogonal to the central axis C1 and the lower surface 13 having an inclined surface relative to the upper surface 14. The thickness of the front end 11a is thinner than the thickness of the back portion 11b. Accordingly the second plate 22 may have the lower surface 23 orthogonal to the central axis C1 and the upper surface 24 having an inclined surface relative to the lower surface 23. The thickness of the front end 21a is thinner than the thickness of the back portion 21b.

The first plate 12 and the second plate 22 have cutout portions 15, 25, respectively. Each of the cutout portions 15, 25 extends along the rotation direction from the front end 11a, 21a to the back portion 11b, 21b in the rotation direction. The cutout portion 15 and the cutout portion 25 are formed in the same position in the radial direction about the central axis C1.

The width of the cutout portion 15, 25 (the length in the radial direction about the central axis C1) is slightly larger than the diameter of the portion at the space 130 (neck portion) in the shank 120 of the electrode member 100, and smaller than the diameter of the end surface 111 of the electrode tip 110 and the diameter of the end surface 126 of the large diameter portion 125.

The length of the cutout portion 15 (the length along the rotation direction about the central axis C1) is substantially the same as the diameter of the portion at the space 130 (neck portion) in the shank 120 of the electrode member 100. On the other hand, the length of the cutout portion 25 is longer than the length of the cutout portion 15. The length of the cutout portion 25 may be the same as the length of the cutout portion 15. In this case, the first plate member 10 and the second plate member 20 have the same shape.

The cutout portion 15, 25 has a shape into which the leading end portion 122 of the shank 120 in the space 130 of the electrode member 100 is fitted. A part of the first plate 12 around the cutout portion 15 and a part of the second plate 22 around the cutout portion 25 are inserted into the space 130 from the outside in the radial direction (the radial direction about the central axis C2) of the shank 120. As the first plate member 10 and the second plate member 20 relatively rotate about the central axis C1, the front ends 11a, 21a provided with the cutout portions 15, 25, respectively, are inserted into the space 130 in the facing direction of the front ends 11a, 21a.

The length of the cutout portion 25 is set such that an opening portion formed by the overlap of the cutout portion 15 and the cutout portion 25 has a diameter larger than the diameter of the shank 120 in the space 130 (neck portion) of the electrode member 100 at the rotation angle at which the thickness L by the overlap of the first plate 12 and the second plate 22 is larger than the size L1 of the space 130 in the electrode member 100 (L1<L).

Next, the operation of the removal device 1 of the embodiment is described. FIGS. 4A, 5A, 6A, 7A are perspective views each illustrating the operation of removing the electrode tip 110 by the removal device 1. FIGS. 4B, 5B, 6B, 7B are side views of FIGS. 4A, 5A, 6A, 7A.

Figure 4A:
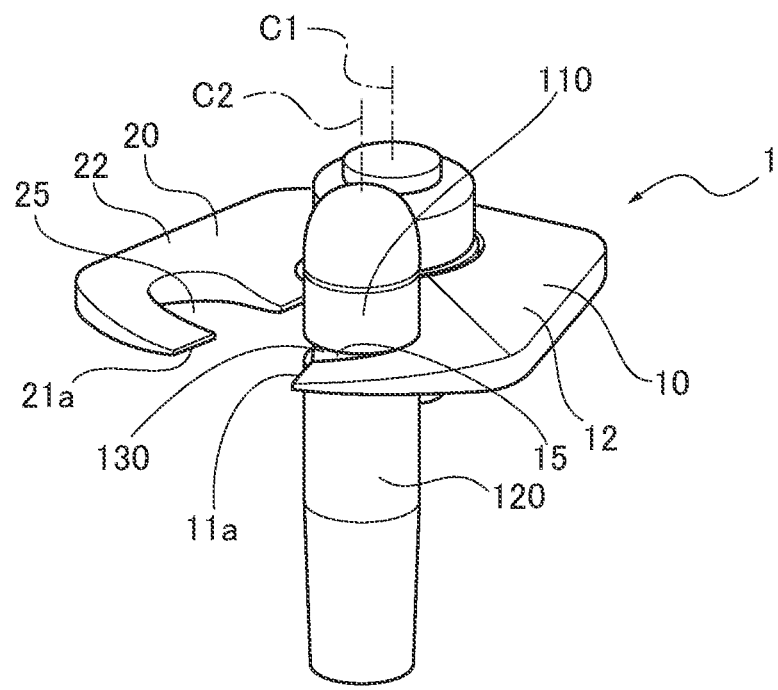
FIG. 4A is a first perspective view illustrating an operation of removing the electrode tip by the removal device.

As illustrated in FIG. 4A, the removal device 1 is disposed to have the central axis C1 parallel to the central axis C2 of the shank 120. Then, the front end 11a of the first plate 12 is inserted into the space 130 to place the cutout portion 15 of the first plate member 10 in the space 130 of the shank 120 in the electrode member 100. In this case, the front end

Figure 4B:
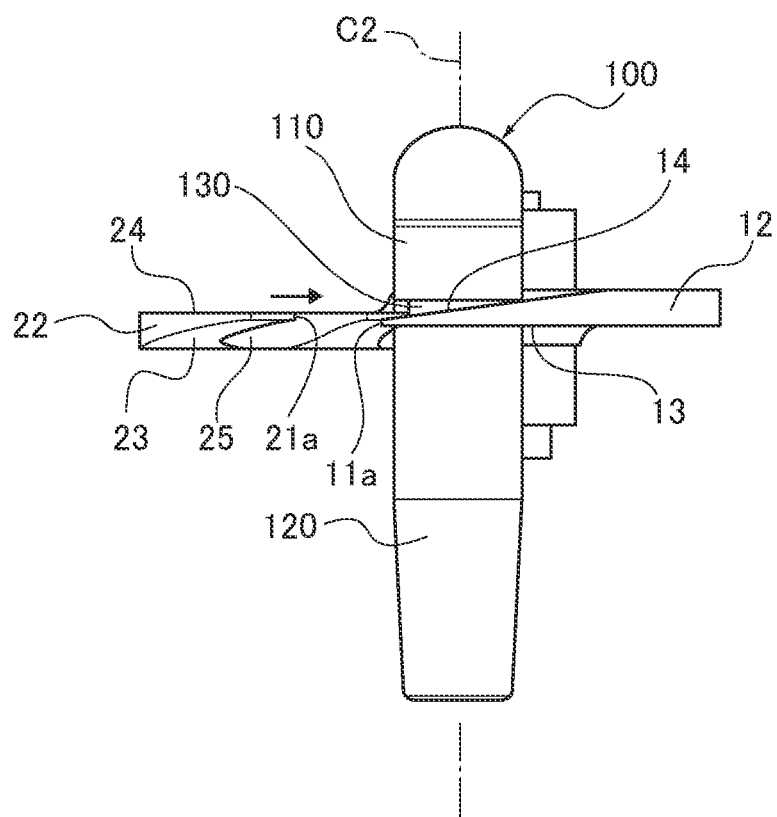
FIG. 4B is a side view of FIG. 4A.

11a is disposed in the lower half portion of the space 130 (the portion close to the end surface 126 of the shank 120) (refer to FIG. 4B).

Figure 5A:
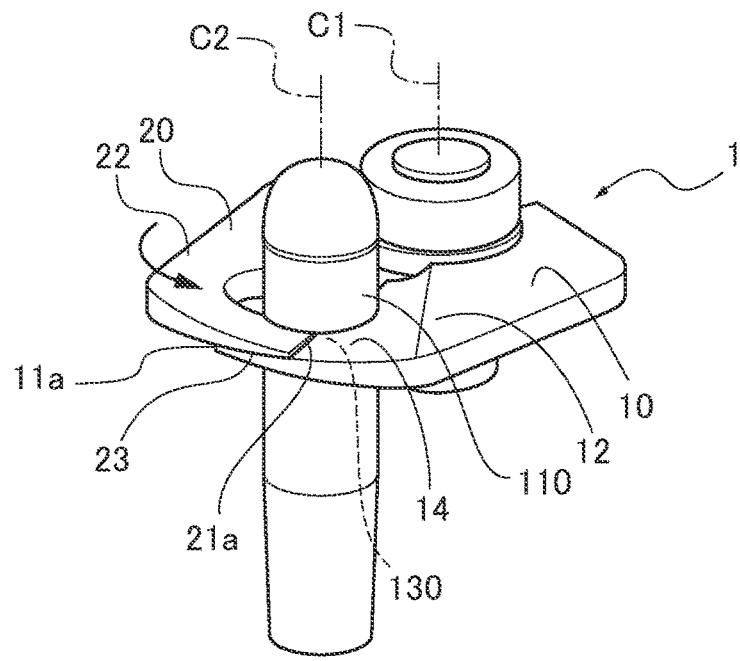
FIG. 5A is a second perspective view illustrating an operation of removing the electrode tip by the removal device.
Figure 5B:
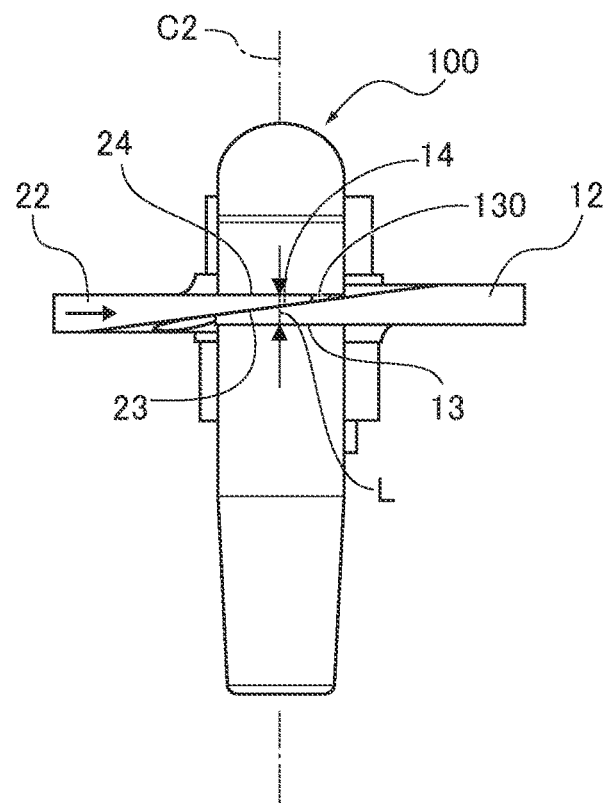
FIG. 5B is a side view of FIG. 5A.

Next, as illustrated in FIG. 5A, the second plate member 20 rotates about the central axis C1 of the shaft member 30 in the direction in which the front end 21a comes close to the front end 11a of the first plate member 10, and the front end 21a of the second plate 22 is inserted into the space 130. Then, the front end 21a crosses the front end 11a. When the front end 21a reaches the inclined surface of the upper surface 14 of the first plate 12, the inclined surface of the lower surface 23 of the second plate 22 contacts the inclined surface of the upper surface 14 of the first plate 12, and the first plate 12 and the second plate 22 overlap in the direction of the central axis C1 (refer to FIG. 5B).

At the beginning of the contact of the inclined surface of the lower surface 23 of the second plate 22 and the inclined surface of the upper surface 14 of the first plate 12, the thickness L by the overlap of the first plate 12 and the second plate 22 is smaller than the length (size) L1 of the space 130 in the electrode member 100 (L<L1).

Figure 6A:
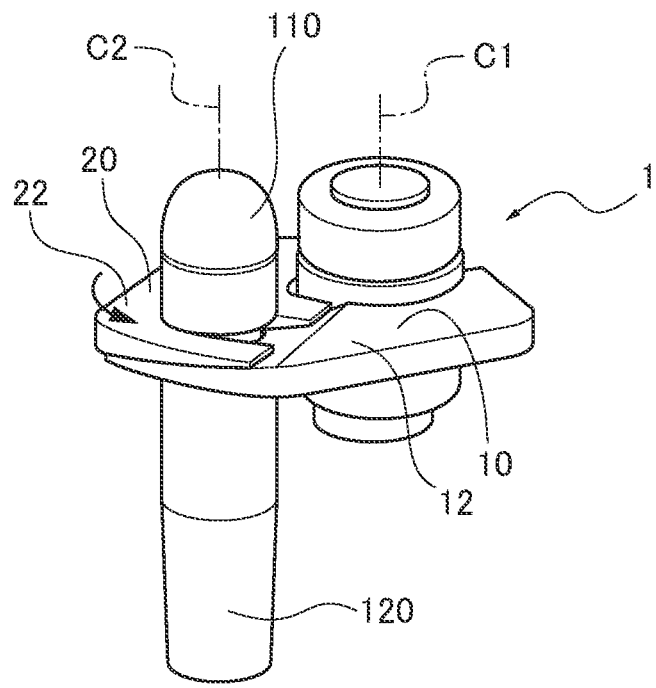
FIG. 6A is a third perspective view illustrating an operation of removing the electrode tip by the removal device.
Figure 6B:
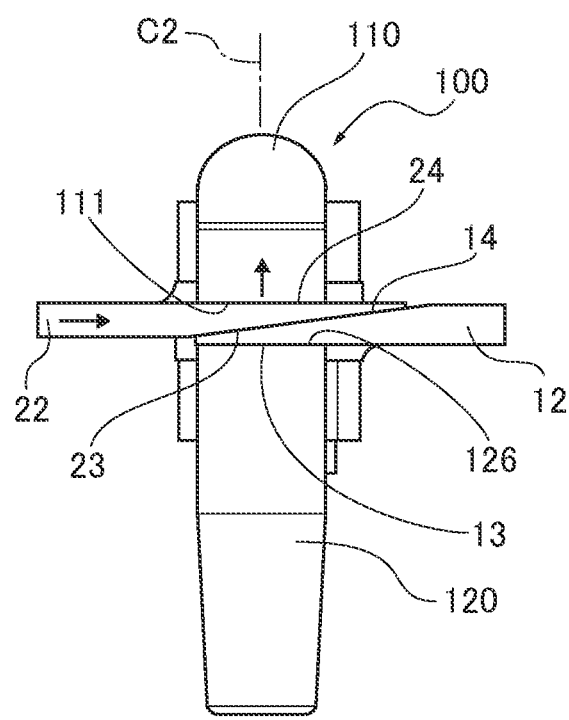
FIG. 6B is a side view of FIG. 6A.

As illustrated in FIG. 6A, by further rotating the second plate member 20 while the inclined surface of the lower surface 23 of the second plate 22 contacts the inclined surface of the upper surface 14 of the first plate 12, the second plate 22 is pushed upward by the first plate 12, and the second plate member 20 displaces above the first plate member 10 in the direction of the central axis C1. The thickness L by the first plate 12 and the second plate 22 thereby gradually increases, and the thickness L becomes substantially the same as the length (size) L1. As illustrated in FIG. 6B, upon this matching of the thickness L and the size L1, the lower surface 13 of the first plate 12 contacts the end surface 126 of the large diameter portion 125, and the upper surface 24 of the second plate 22 contacts the end surface 111 of the electrode tip 110.

In this case, the lower surface 13 of the first plate 12 and the end surface 126 of the large diameter portion 125 are surfaces orthogonal to the central axis C1. A part of the lower surface 13 of the first plate 12, which is inserted into the space 130, contacts the end surface 126 on both sides thereof across the central axis C2. The upper surface 24 of the second plate 22 and the end surface 111 of the electrode tip 110 are also surfaces orthogonal to the central axis C1. A part of the upper surface 24 of the second plate 22, which is inserted into the space 130, also contacts the end surface 111 on both sides thereof across the central axis C2.

Figure 7A:
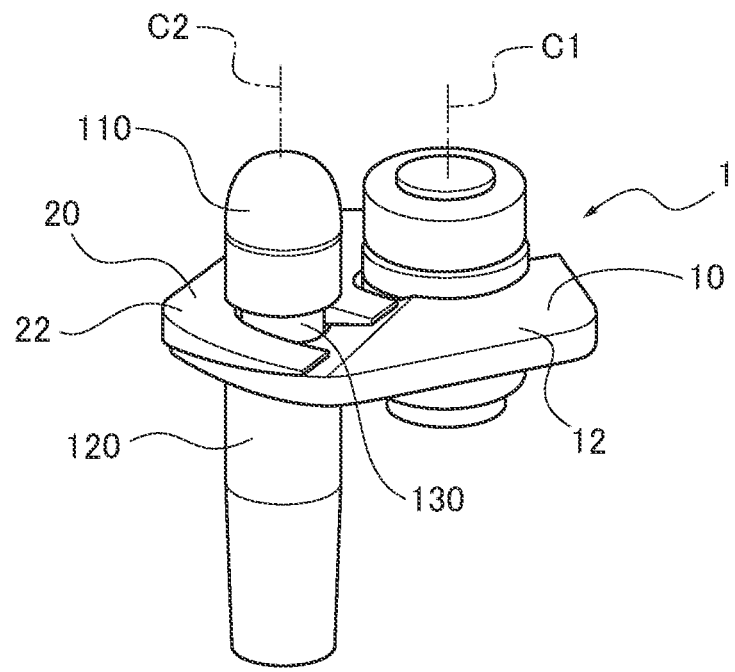
FIG. 7A is a fourth perspective view illustrating an operation of removing the electrode tip by the removal device.
Figure 7B:
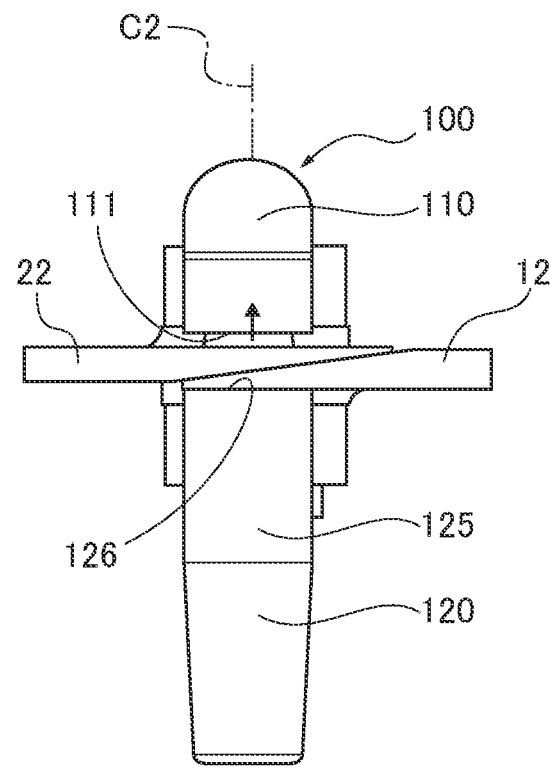
FIG. 7B is a side view of FIG. 7A.

As illustrated in FIG. 7A, by further rotating the second plate member 20, the thickness L by the overlap of the first plate 12 and the second plate 22 becomes larger than the length (size) L1 of the space 130 (L1<L). The lower surface 13 of the first plate 12 thereby presses the end surface 126 of the large diameter portion 125 downward while the upper surface 24 of the second plate 22 presses the end surface 111 of the electrode tip 110 upward. The end surface 111 of the electrode tip 110 and the end surface 126 of the large diameter portion 125 thereby displace in the directions away from each other, and the electrode tip 110 is removed from the shank 120.

As described above, according to the removal device 1 of the present embodiment, the electrode tip 110 is removed from the shank 120 with a simple configuration which relatively displaces the first plate 12 and the second plate 22 as the two facing insertion pieces each having a wedge shape.

In the removal device 1 of the present embodiment, the two plates 12, 22 inserted into the space 130 integrally receive the reactive force from the end surface 111 of the electrode tip 110 and the reactive force from the end surface 126 of the large diameter portion 125 of the shank 120, respectively, in the direction of the central axis C1. When increasing the size L1 of the space 130 with the thickness L by the overlap of the two plates 12, 22, the two plates 12, 22 receive the compressive loads due to the above-described reactive forces. However, each of the plates 12, 22 is free from the bending moment and the shearing force because each of the plates 12, 22 receives the load on both sides thereof across the central axis C1. Accordingly, the plates 12, 22 are hardly damaged and deformed even when a large load is applied in the direction of the central axis C1.

The removal device 1 of the present embodiment therefore prevents or controls the plates 12, 22 from being damaged or deformed without increasing the strength of the plates 12, 22.

In the removal device 1 of the present embodiment, when the thickness L by the overlap of the two plates 12, 22 is equal to the size L1 of the space 130 or more, a part of the lower surface 13 of the first plate 12, which is inserted into the space 130, surface-contacts the end surface 126. This surface receives the load in the direction of the central axis C1, which makes possible to lower the surface pressure to be smaller than that when the load is received by line-contact.

The overlap of the two plates 12, 22 equally applies the force along the direction of the central axis C1 to both end surfaces 111, 126, which makes possible to remove the electrode tip 110 in a straight line along the central axis C1.

In the removal device 1 of the present embodiment, each of the upper surface 14 of the first plate 12 and the lower surface 23 of the second plate 22 includes the inclined surface having a thickness gradually increasing in proportional to the rotation angle about the central axis C1. The thickness L by the overlap of the plates 12, 22 thereby increases in proportion to the rotation angle when the first plate member 10 and the second plate member 20 relatively rotate about the central axis C1.

As described above, the removal device 1 easily controls the change in the thickness L relative to the rotation angle by increasing the thickness L in proportional to the rotation angle compared to a device which changes the thickness L without being in proportional to the rotation angle. The thickness L is controlled with a configuration which rotates at least one of the first plate member 10 and the second plate member 20 with, for example, an actuator which controls the rotation angle.

In the removal device 1 of the present embodiment, both of the first plate member 10 and the second plate member 20 are movable along the direction of the central axis C1. However, the removal device 1 of the present embodiment is not limited to this configuration. At least one of the first plate member 10 and the second plate member 20 may be movable in the direction away from the other of the members along the direction of the central axis C1. In this case, it is not necessary to form the shaft member 30 independently from the first plate member 10 and the second plate member 20, and the shaft member 30 may be integrally formed with the first plate member 10 or the second plate member 20.

In the removal device 1 of the present embodiment, at least one of the first plate member 10 and the second plate member 20 is movable along the direction of the central axis C1, which makes possible to change the thickness by the overlap of the first plate member 10 and the second plate member 20 by the movement of at least one of the first plate member 10 and the second plate member 20 along the direction of the central axis C1.

However, the removal device of the welding electrode tip according to the present disclosure is not limited to the one capable of changing the thickness by the overlap of the first insertion piece and the second insertion piece by the movement of at least one of the first insertion piece and the second insertion piece along the direction of the central axis. Namely, as long as the removal device of the welding electrode tip according to the present disclosure includes the configuration which changes the thickness by the overlap of the first insertion piece and the second insertion piece, it is not necessary to move any of the first insertion piece and the second insertion piece in the direction of the central axis.

For example, the lower surface 13 of the first plate 12 in the above described removal device 1 may have the inclined surface from the front end 11a to the back portion 11b, and the upper surface 14 may be the surface orthogonal to the central axis C1. The upper surface 24 of the second plate 22 also may have the inclined surface from the front end 21a to the back portion 21b, and the lower surface 23 may also be the surface orthogonal to the central axis C1.

When the first plate 12 and the second plate 22 configured as described above relatively rotate about the central axis C1, the lower surface 23 of the second plate 22 contacts the upper surface 14 of the first plate 12. By further rotating the first plate member 10 and the second plate member 20 to further overlap the first plate 12 and the second plate 22, both of the first plate 12 and the second plate 22 do not move in the direction of the central axis C1, but the thickness L by the overlap of the first plate 12 and the second plate 22 increases between the inclined lower surface 13 of the first plate 12 and the inclined upper surface 24 of the second plate 22.

The inclined lower surface 13 of the first plate 12 thereby presses the end surface 126 of the large diameter portion 125 downward while the inclined upper surface 24 of the second plate 22 thereby presses the end surface 111 of the electrode tip 110 upward, so that the electrode tip 110 is removed from the shank 120.

In the removal device 1 of the present embodiment, at least one of the first plate 12 and the second plate 22 is movable in the direction of the central axis C1 (the direction orthogonal to the relative rotation direction). Accordingly, the overlapped surfaces (contact surfaces) of the first plate 12 and the second plate 22 are formed to have inclined surfaces. The lower surface 13 of the first plate 12 and the upper surface 24 of the second plate 22 are the surfaces orthogonal to the central axis C1. The contact area of the lower surface 13 of the first plate 12 and the end surface 126 of the large diameter portion 125 and the contact area of the upper surface 24 of the second plate 22 and the end surface 111 of the electrode tip 110 therefore increase to be larger than those in the conventional configuration (line contact).

The removal device 1 of the present embodiment includes the configuration which makes at least one of the first plate 12 and the second plate 22 to be rotatable about the central axis C1 relative to the other of the plates. This configuration makes easy to apply rotating power generated by, for example, an actuator to relatively rotate the first plate member 10 and the second plate member 20.

Exemplified Variation 1

The removal device 1 of the present embodiment may be provided with a rotation operation support member that applies a larger torque when manually applying a toque which relatively rotates the first plate member 10 and the second plate member 20.

Figure 8:
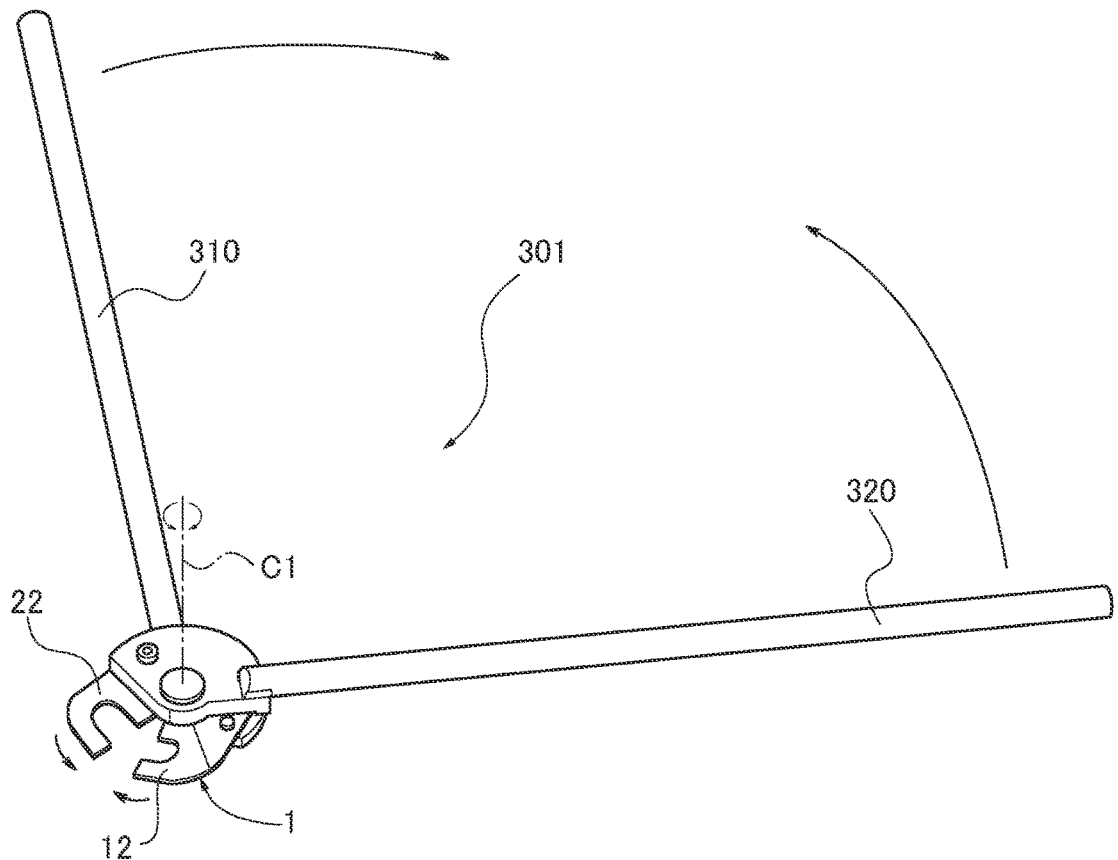
FIG. 8 is a perspective view illustrating a removal device of an exemplified variation 1 including a handle as one example of a rotation supporting member suitable for manually applying a torque to the removal device illustrated in FIG. 1, and illustrating a first plate and a second plate without being overlapped.
Figure 9:
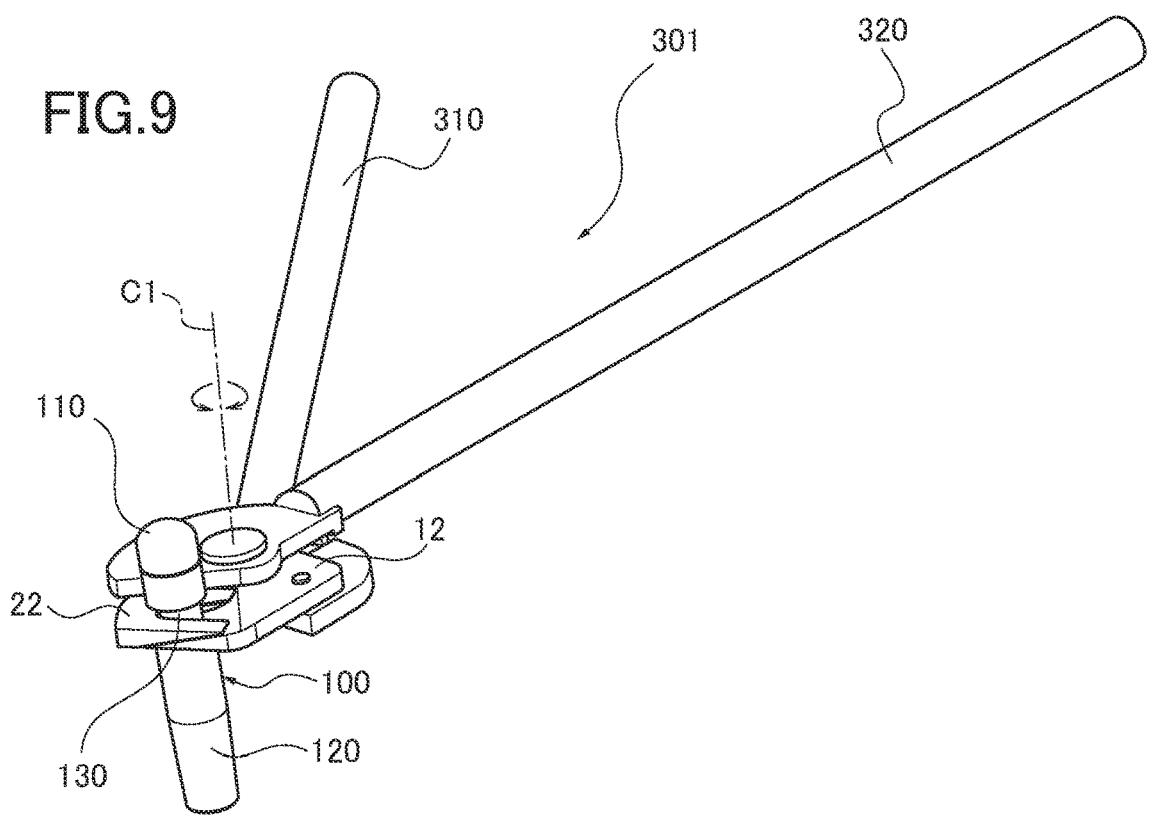
FIG. 9 is a perspective view illustrating the removal device of the exemplified variation 1 including the handle as one example of the rotation supporting member suitable for manually applying a toque to the removal device illustrated in FIG. 1, and illustrating the first plate and the second plate with being overlapped.

FIGS. 8, 9 are perspective views each illustrating a removal device 301 of an exemplified variation 1 including grips 310, 320 as one example of the rotation operation support member which are suitable for manually applying a torque to the removal device 1 illustrated in FIG. 1. In FIG. 8, the first plate 12 and the second plate 22 are not overlapped while in FIG. 9, the first plate 12 and the second plate 22 are overlapped.

In the removal device 301 of the exemplified variation 1 illustrated in FIGS. 8, 9, the grip 310 extending in the direction opposite to the first plate 12 across the central axis C1 is connected to the first plate 12, and the grip 320 extending in the direction opposite to the second plate 22 across the central axis C1 is connected to the second plate 22.

By applying a force to both hands one of which holds the grip 310 and the other of which holds the grip 320 in the direction narrowing the angle about the central axis C1 between the grip 310 and the grip 320, a large torque about the central axis C1 can be applied between the first plate 12 and the second plate 22. As illustrated in FIG. 9, the electrode tip 110 is thereby removed by the large torque when the first plate 12 and the second plate 22 are inserted into the space 130 of the electrode member 100.

The removal device 301 of the exemplified variation 1 is merely one example of the removal device including the rotation operation support member that manually applies a large torque. The configuration that manually applies a torque to at least one of the first plate 12 and the second plate 22 is not limited to the above-described grips 310, 320.

Exemplified Variation 2

The removal device 1 of the present embodiment may be provided with a power source that applies rotating power to the device other than a manual power source. The power relatively rotates the first plate member 10 and the second plate member 20.

Figure 10A:
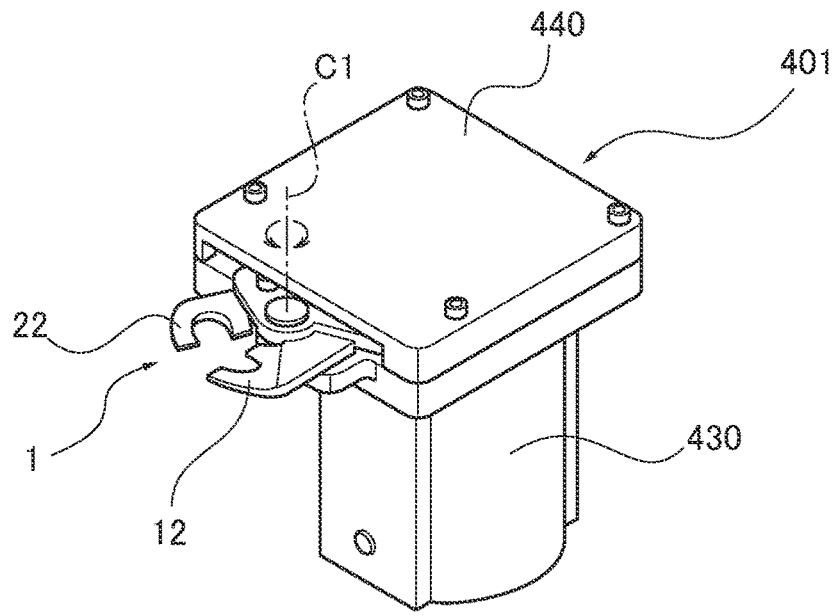
FIG. 10A is a perspective view illustrating a removal device of an exemplified variation 2 including an actuator as one example for applying a torque with a power source to the removal device illustrated in FIG. 1 without using a manual member, and illustrating a first plate and a second plate without being overlapped in a usage condition covering a movable portion of the actuator with a cover.
Figure 10B:
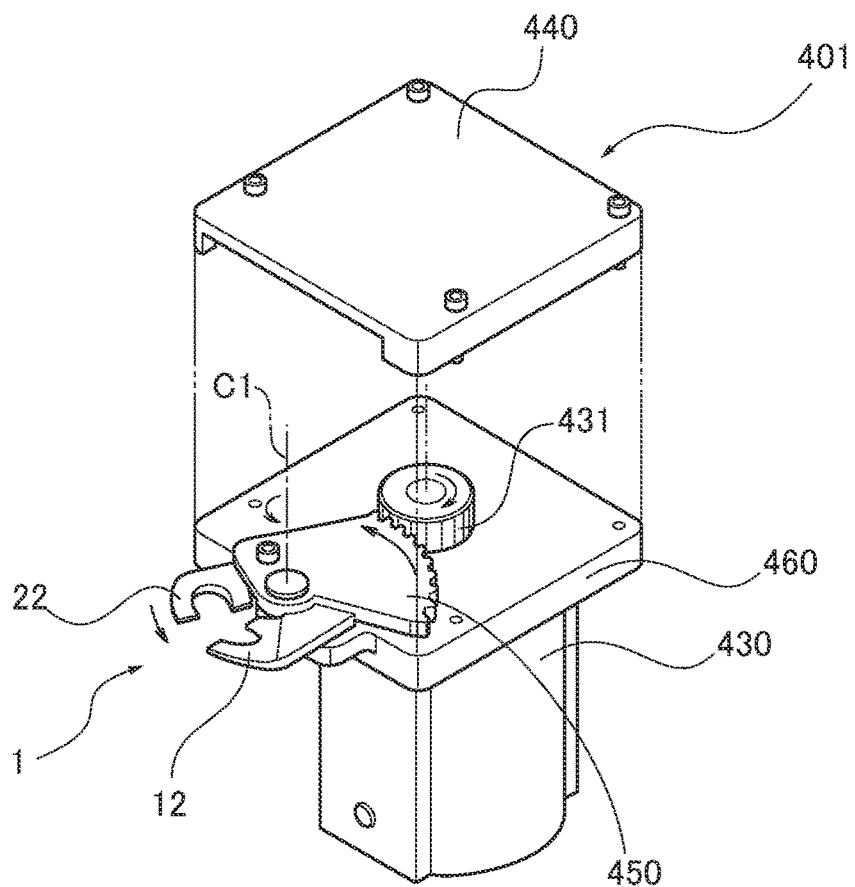
FIG. 10B is a perspective view illustrating the removal device in FIG. 10A from which the cover is removed.
Figure 11:
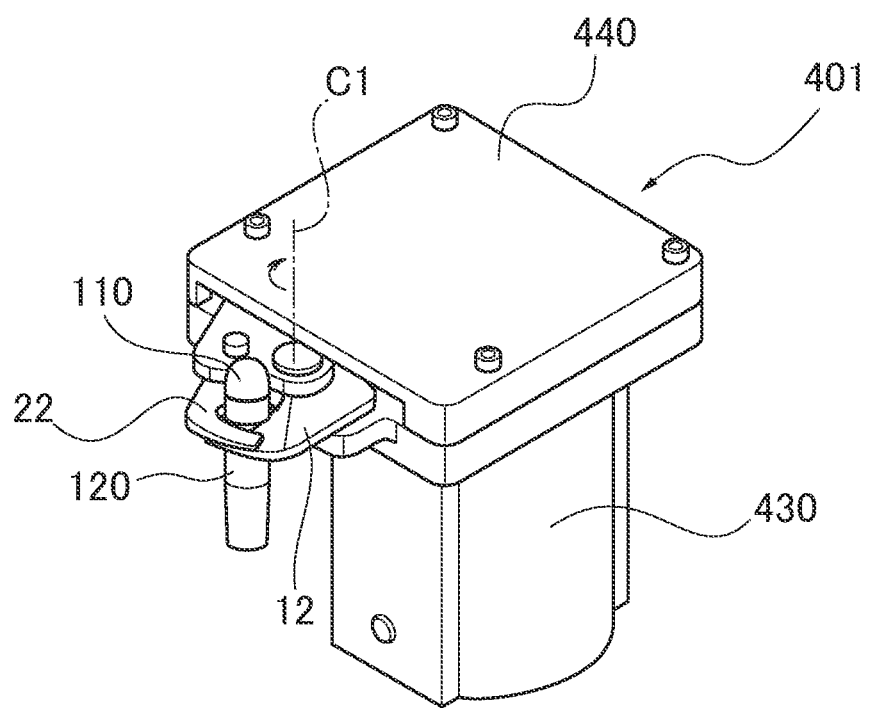
FIG. 11 is a perspective view illustrating the removal device of the exemplified variation 2 including the actuator as one example for applying a torque with the power source to the removal device illustrated in FIG. 1 without using the manual member, and the illustrating the first plate and the second plate with being overlapped.

FIGS. 10A, 10B, 11 are perspective views each illustrating a removal device 401 of an exemplified variation 2 with an actuator 430 as one example that applies a torque to the removal device 1 illustrated in FIG. 1 with a power source other than a manual power source. FIG. 10A shows a usage state in which the first plate 12 and the second plate 22 are not overlapped. In FIG. 10A, a movable portion (for example, a gear 431) of the actuator 430 is covered with a cover 440. In FIG. 10B, the cover 440 is removed. In FIG. 11, the first pate 12 and the second plate 22 are overlapped.

The removal device 401 of the exemplified variation 2 illustrated in FIGS. 10A, 10B, 11 includes, in the removal device 1 of the embodiment, the actuator 430 that rotates the second plate 22 relative to the first plate 12. The actuator 430 is fixed to a support plate 460 that supports the removal device 1. The first plate 12 is fixed to the support plate 460.

The removal device 401 includes a gear 450. The gear 450 meshes with a gear 431 of the actuator 430, is fixed to the second plate 22, and rotates about the central axis C1 according to the rotation of the actuator 430.

In the removal device 401 of the exemplified variation 2 illustrated in FIGS. 10A, 10B, the second plate 22 rotates about the central axis C1 relative to the first plate 12 through the gears 431, 450 by rotating the actuator 430. As illustrated in FIG. 11, the electrode tip 110 is thereby removed by the torque applied with the actuator 430 when the first plate 12 and the second plate 22 are inserted into the space 130 of the electrode member 100.

The removal device 401 of the exemplified variation 2 illustrated in FIGS. 10A, 10B, 11 is merely one example in which the removal device is configured to apply a torque by the actuator 430. A known actuator such as a servomotor, a stepping motor, a linear motor, and a fluid pressure cylinder may be applied as the configuration that applies a torque to at least one of the first plate 12 and the second plate 22 with a power source in addition to a manual member.

Exemplified Variation 3

The removal device 1 of the embodiment and the removal devices 301, 401 of the exemplified variations 1, 2 include the configuration that relatively rotates the first plate 12 and the second plate 22 about the central axis C1. However, the removal device of the welding electrode tip according to the present disclosure is not limited to this configuration.

FIGS. 12A, 13A, 14A, 15A are perspective views each illustrating an operation of removing the electrode tip 110 by a removal device 501 of the exemplified variation 3. FIGS. 12B, 13B, 14B, 15B are side views of FIGS. 12A, 13A, 14A, 15A, seen from the arrow direction of FIG. 12A.

As illustrated in FIGS. 12A, 13A, 14A, 15A, the removal device 501 of the exemplified variation 3 includes a first plate 512 and a second plate 522 instead of the first plate member 10 and the second plate member 20 in the removal device 1 of the embodiment.

In the removal device 1 of the embodiment 1, at least one of the first plate 12 and the second plate 22 is rotatable about the central axis C1 relative to the other of the plates. In the removal device 501, at least one of the first plate 512 and the second plate 522 is movable in a straight line relative to the other of the first plate 512 and the second plate 522. More specifically, the first plate 512 is fixed while the second plate 522 is only movable in a straight line toward the first plate 512.

Similar to the first pate 12 and the second plate 22, the first plate 512 and the second plate 522 are inserted into the space 130 from the outside of the shank 120 in the radial direction in a straight line to face each other. The space 130 is formed between the end surface 126 of the large diameter portion 125 of the shank 120 and the end surface 111 of the electrode tip 110. Each of the first plate 512 and the second plate 522 has a wedge shape having a thickness gradually increasing from a front end to a back portion in the insertion direction.

The first plate 512 and the second plate 522 have the thickness L by the overlap of the first plate 512 and the second plate 522. The thickness L changes between the thickness smaller than the size L1 of the space 130 and the thickness larger than the size L1 of the space 130 according to the overlap amount of the first plate 512 and the second plate 522.

A cutout portion 515 formed in the first plate 512 corresponds to the cutout portion 15 formed in the first plate 12, and a cutout portion 525 formed in the second plate 522 corresponds to the cutout portion 25 formed in the second plate 22. Both of the cutout portions 515, 525 are located to face each other in the movement direction of the second plate 522. The cutout portion 515, 523 has a shape into which the leading end portion 122 of the shank 120 in the space 130 is fitted.

The first plate 512 includes an upper surface 514 having an inclined surface similar to the upper surface 14 of the first plate 12, and a lower surface 513 having a plane orthogonal to the central axis C2 of the electrode member 100 similar to the lower surface 13 of the first plate 12. The second plate 522 includes a lower surface 523 having an inclined surface similar to the lower surface 23 of the second plate 22, and an upper surface 524 having a plane orthogonal to the central axis C2 of the electrode member 100 similar to the upper surface 24 of the second plate 22. The inclined surfaces of the upper surface 514 and the lower surface 523 have the thickness L by the overlap of both plates 512, 522. The thickness L increases in proportional to the moving distance in the straight movement direction.

Figure 12A:
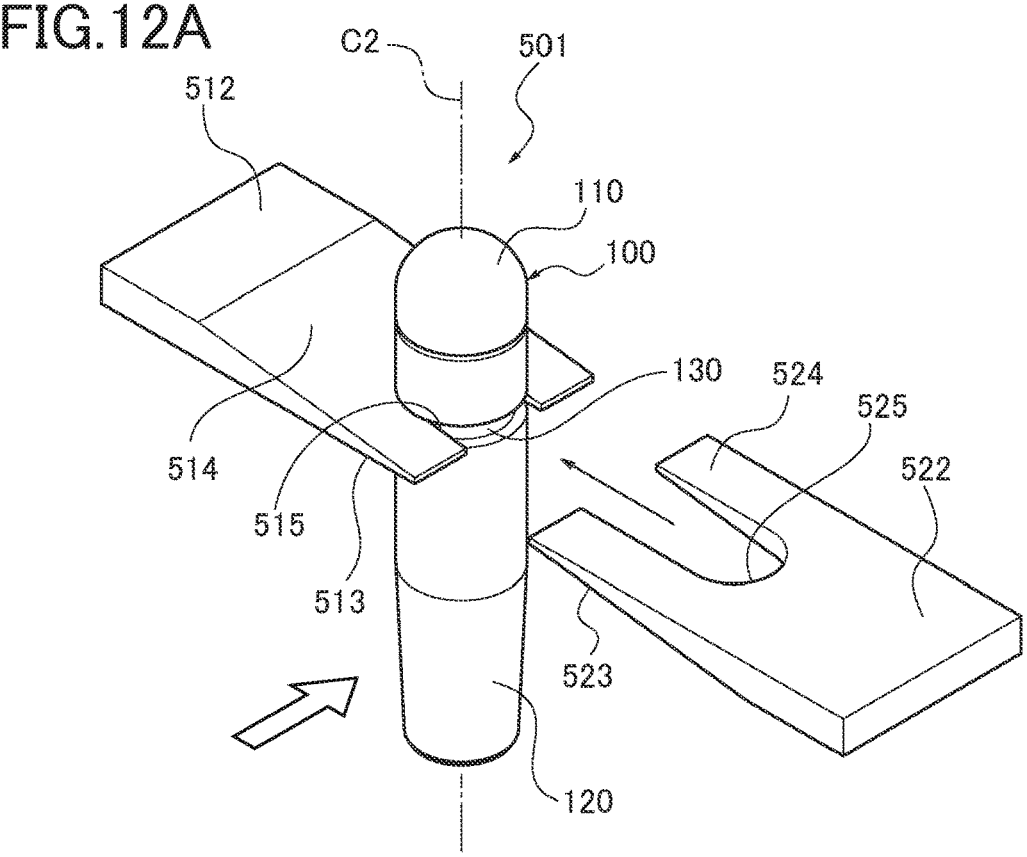
FIG. 12A is a first perspective view illustrating an operation of removing an electrode tip by a removal device of an exemplified variation 3.
Figure 12B:
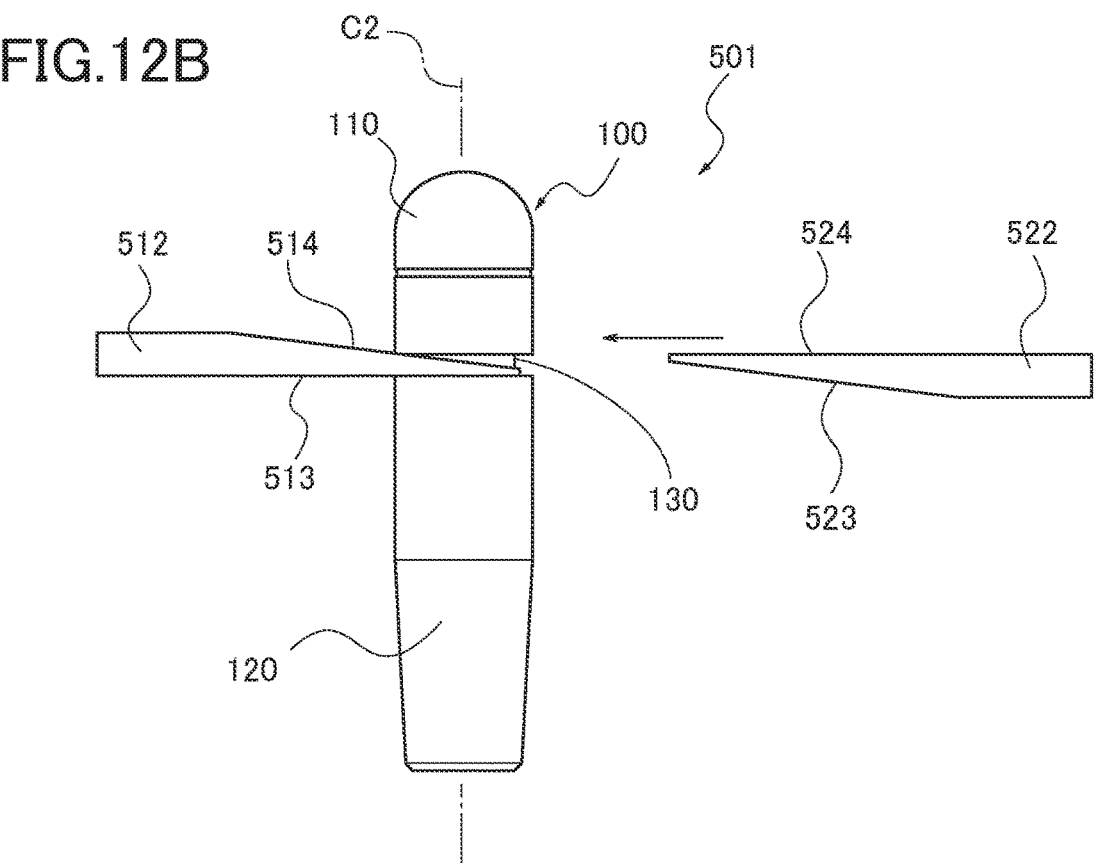
FIG. 12B is a side view of FIG. 12A, seen from an arrow direction of FIG. 12A.

In the removal device 501 of the exemplified variation 3 as described above, as illustrated in FIG. 12A, the leading end portion 122 of the shank 120 in the space 130 of the electrode member 100 is disposed in the cutout portion 515 of the first plate 512, and the first plate 512 is inserted into the space 130 (refer to FIG. 12B).

Figure 13A:
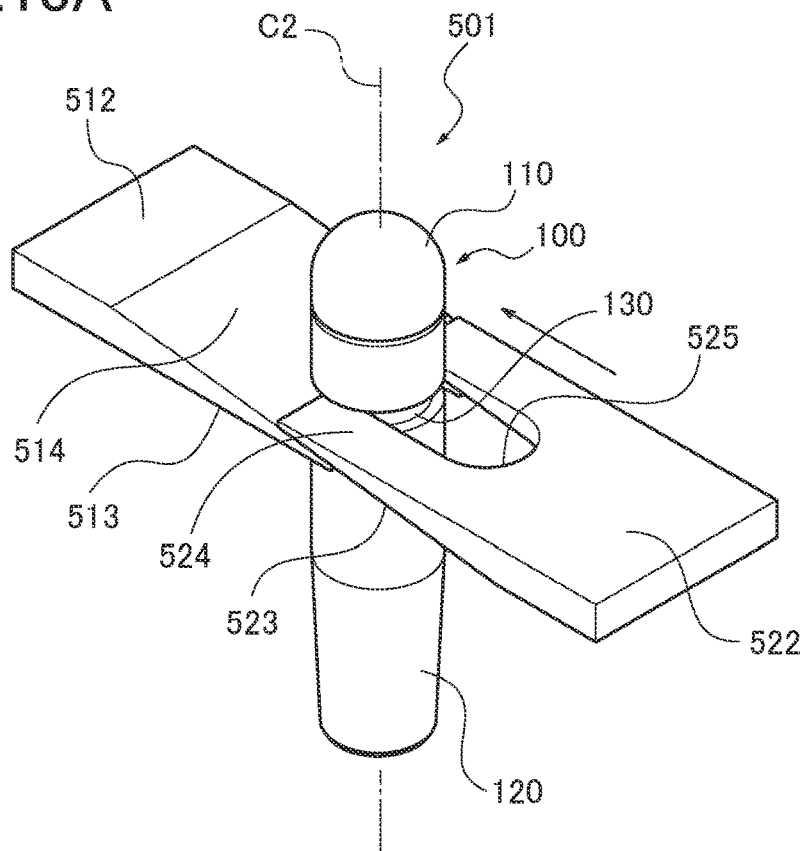
FIG. 13A is a second perspective view illustrating the operation of removing the electrode tip by the removal device of the exemplified variation 3.
Figure 13B:
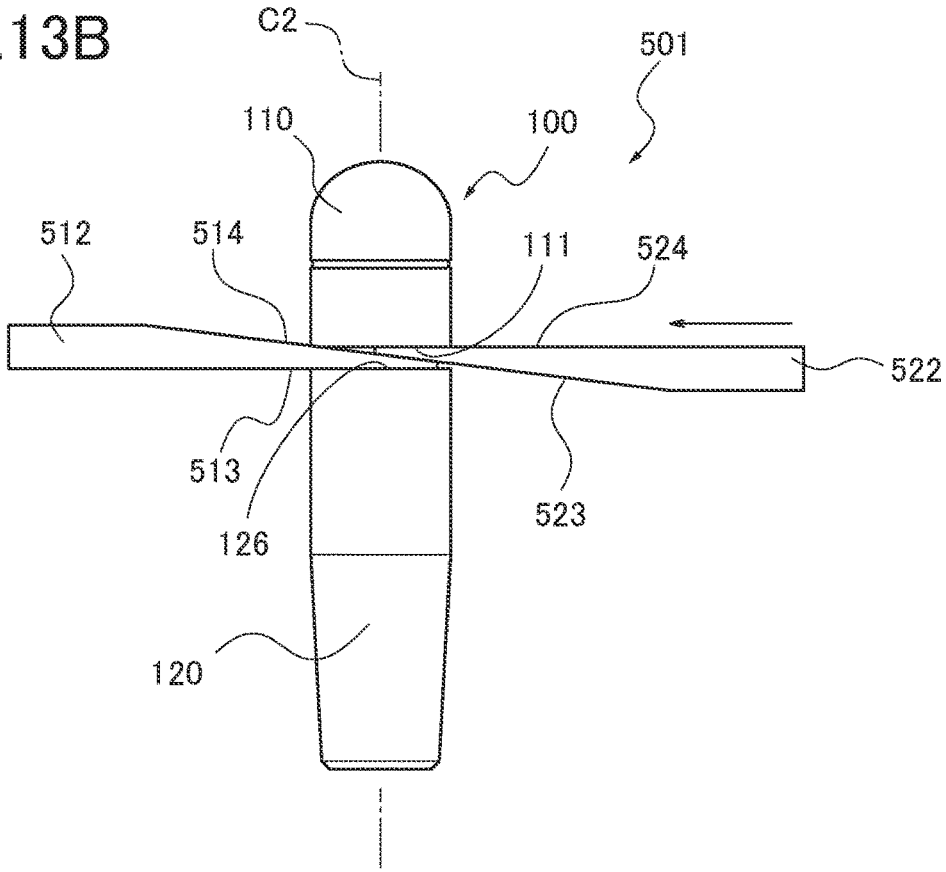
FIG. 13B is a side view of FIG. 13A, seen from the arrow direction of FIG. 12A.
Figure 14A:
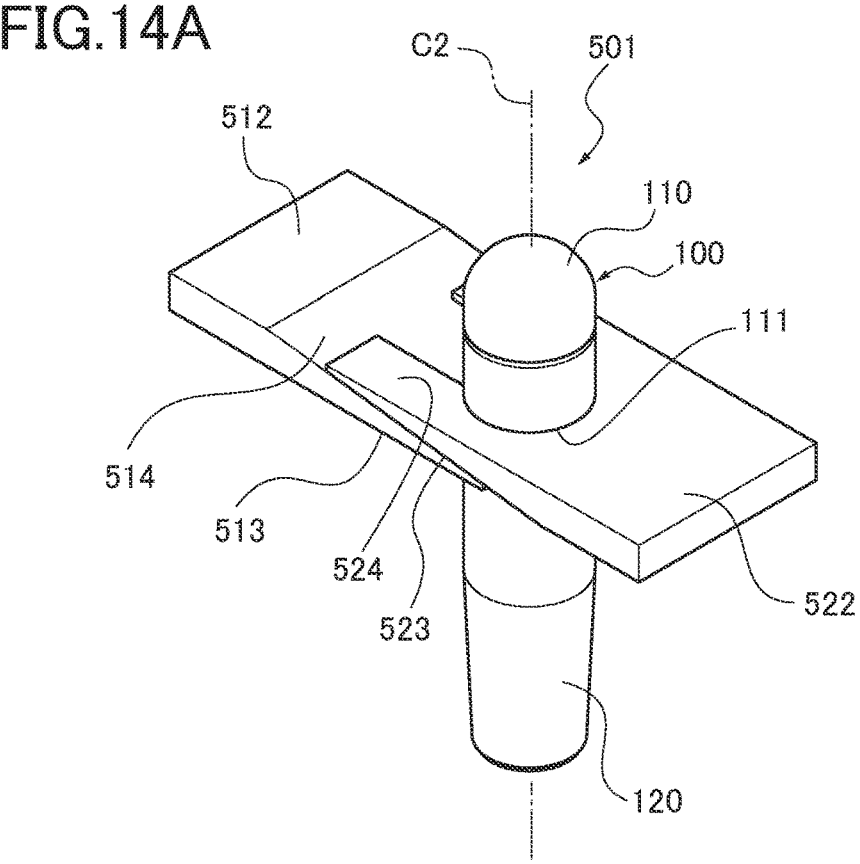
FIG. 14A is a third perspective view illustrating the operation of removing the electrode tip by the removal device of the exemplified variation 3.
Figure 14B:
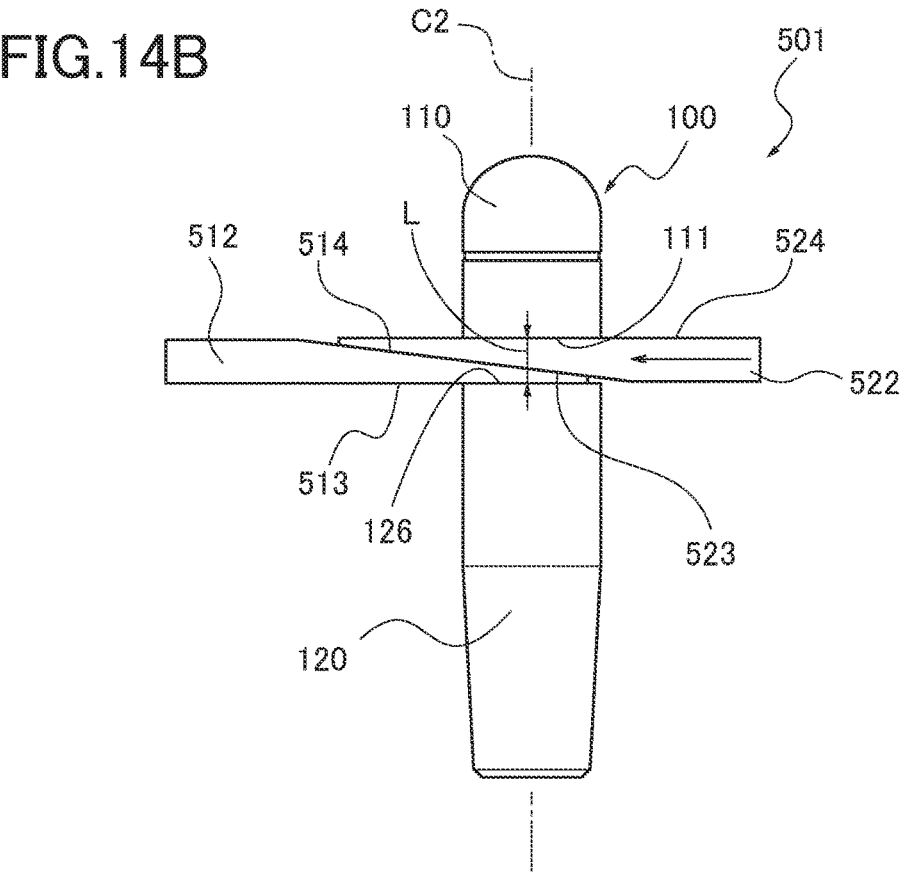
FIG. 14B is a side view of FIG. 14A, seen from the arrow direction of FIG. 12A.

Next, as illustrated in FIG. 13A, the second plate 522 moves in a straight line in the direction in which the second plate 522 comes close to the first plate 512, and the second plate 522 is inserted into the space 130 (refer to FIG. 13B). As illustrating FIG. 14A, by further inserting the second plate 522 into the space 130, the second plate 522 is pushed upward by the first plate 512, the thickness L by the overlap of the first plate 512 and the second plate 522 in the space 130 increases, and the second plate 522 presses the end surface 111 of the electrode tip 110 upward while the first plate 512 presses the end surface 126 of the large diameter portion 125 downward (refer to FIG. 14B).

Figure 15A:
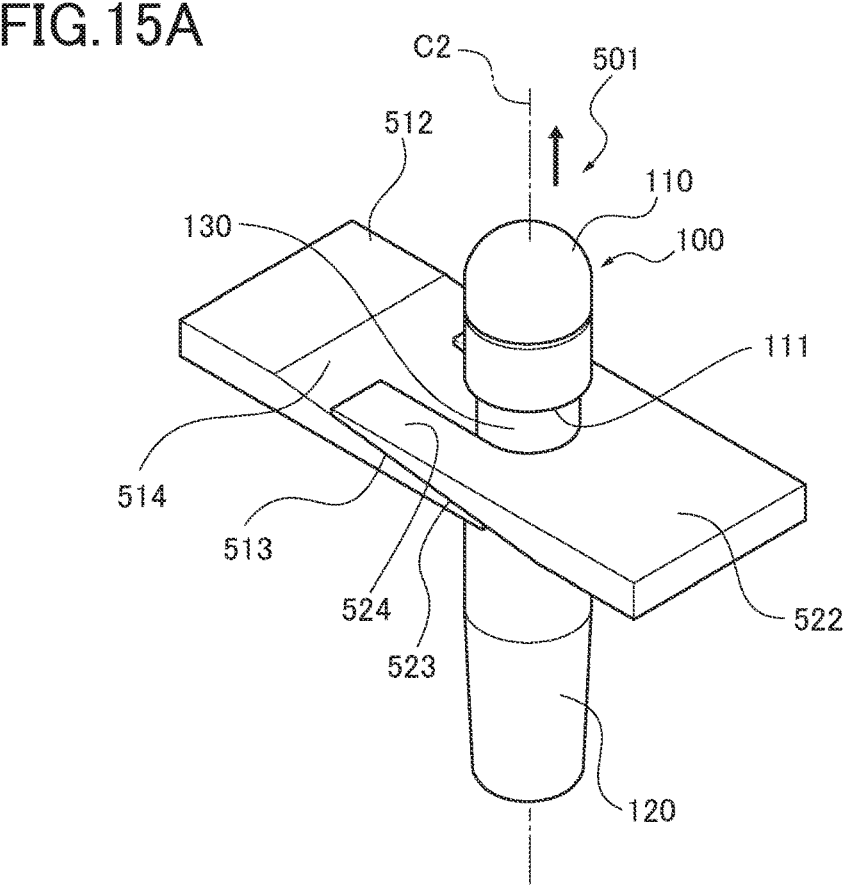
FIG. 15A is a fourth perspective view illustrating the operation of removing the electrode tip by the removal device of the exemplified variation 3.
Figure 15B:
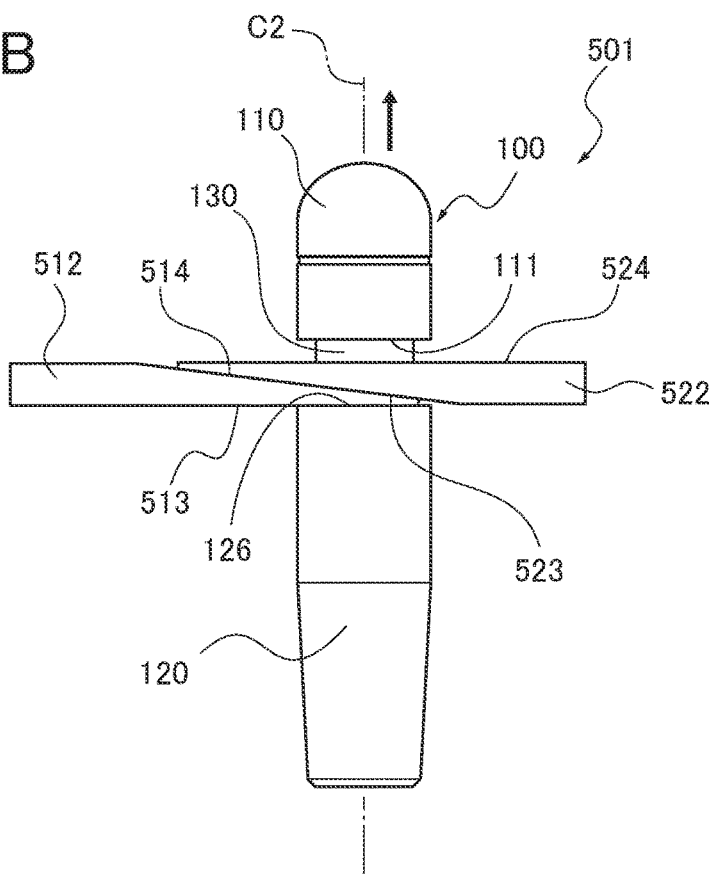
FIG. 15B is a side view of FIG. 15A, seen from the arrow direction of FIG. 12A.

As illustrated in FIG. 15A, by further inserting the second plate 522 into the space 130, the thickness L by the overlap of the first plate 512 and the second plate 522 in the space 130 exceeds the size L1 of the space 130. The electrode tip 110 is thereby removed from the shank 120.

As described above, the removal device 501 of the exemplified variation 3 can remove the electrode tip 110 from the shank 120 with the simple configuration that relatively moves in a straight line the facing two first and second plates 12, 22 each having the wedge shape.

In addition, the directions that relatively move the first plate 12 and the second plate 22 are not limited to the rotation direction in the embodiment and the starlight direction in the exemplified variations, and may be any direction in addition to the circular arc direction and the straight direction.

Although the first plates 12, 512 of the removal devices 401, 501 in the exemplified variations 2, 3 are fixed, they may be configured to move similar to the second plates 22, 522.

Although the present disclosure has been described in terms of exemplary embodiments, it is not limited thereto. It should be appreciated that variations or modifications may be made in the embodiments described by persons skilled in the art without departing from the scope of the present disclosure as defined by the following claims.

What is claimed is:

1. A removal device of a welding electrode tip mounted on a leading end portion of a shank, the removal device comprising:
a first insertion piece and a second insertion piece that are inserted, in a radial direction from an outside of the shank, into a space formed between an end surface of a large diameter portion of the shank and an end surface of the welding electrode tip to face each other, the large diameter portion having a diameter larger than that of the leading end portion of the shank, the leading end portion of the shank extending from a leading end of the shank to the large diameter portion, each of the first insertion piece and the second insertion piece having a wedge shape having a thickness that increases from a front end to a back portion in an insertion direction, wherein the first insertion piece and the second insertion piece are rotatable about a common axis parallel to an axis of the shank such that the first insertion piece and the second insertion piece can be rotated so as to overlap each other, the first insertion piece and the second insertion piece have a combined thickness by overlap of the first insertion piece and the second insertion piece, and wherein the first and second insertion pieces are configured such that an overlap amount of the first and second insertion pieces in the space increases in proportion to an increase in a rotation angle of the first and second insertion pieces, and such that the combined thickness changes from a thickness smaller than a length of the space to a thickness larger than the length of the space according to the increase in the overlap amount, wherein at least one of the first insertion piece and the second insertion piece is supported to be movable in a direction orthogonal to a rotation direction, wherein each of the first insertion piece and the second insertion piece has a cutout portion extending from the front end to the back portion in the insertion direction, and the cutout portion has a shape into which a part of the shank between the end surface of the large diameter portion and the end surface of the welding electrode tip is fitted.

2. The removal device according to claim 1, wherein the first insertion piece includes a surface that contacts the end surface of the large diameter portion and the second insertion piece includes a surface that contacts the end surface of the welding electrode tip or the first insertion piece includes a surface that contacts the end surface of the welding electrode tip and the second insertion piece includes a surface that contacts the end surface of the large diameter portion, the surface of the first insertion piece is a surface orthogonal to an axis direction, and the surface of the second insertion piece is a surface orthogonal to the axis direction, the first insertion piece includes an inclined surface relative to the orthogonal surface of the first insertion piece, and the second insertion piece includes an inclined surface relative to the orthogonal surface of the second insertion piece, and the inclined surface of the first insertion piece and the inclined surface of the second insertion piece contact each other in the space.

* * * * *